US012726507B1

(12) United States Patent
Pang et al.

(10) Patent No.: US 12,726,507 B1
(45) Date of Patent: Sep. 1, 2026

(54) CYBERSECURITY ASSESSMENT METHOD FOR SHIP ASSETS AND COMPUTING DEVICE FOR PERFORMING SAME

(71) Applicant: COONTEC CO., LTD., Gyeonggi-do (KR)

(72) Inventors: Hyunk Jun Pang, Gyeonggi-do (KR); O Duck Kwon, Seoul (KR); Kihyoun Kim, Gyeonggi-do (KR); Min Hyeok Jo, Gyeonggi-do (KR); Yong Seon Du, Gyeonggi-do (KR)

(73) Assignee: COONTEC CO., LTD., Gyeonggi-do, (KR)

( * ) Notice: Subject to any disclaimer, the term of this patent is extended or adjusted under 35 U.S.C. 154(b) by 0 days.

(21) Appl. No.: 19/536,545

(22) Filed: Feb. 11, 2026

(30) Foreign Application Priority Data

| | | |
|---|---|---|
| Oct. 30, 2025 | (KR) | 10-2025-0160565 |
| Oct. 30, 2025 | (KR) | 10-2025-0160566 |
| Oct. 30, 2025 | (KR) | 10-2025-0160567 |
| Dec. 8, 2025 | (KR) | 10-2025-0193200 |

(51) Int. Cl.
*H04L 9/40* (2022.01)

(52) U.S. Cl.
CPC ...... *H04L 63/1433* (2013.01); *H04L 63/1441* (2013.01)

(58) Field of Classification Search
CPC . H04L 63/1433; H04L 63/1441; G06F 21/50; G06F 21/70; G06F 21/82; G06F 21/88
See application file for complete search history.

(56) References Cited

U.S. PATENT DOCUMENTS

| | | | | |
|---|---|---|---|---|
| 11,863,578 | B1 * | 1/2024 | Speck | G06N 5/022 |
| 11,924,238 | B2 * | 3/2024 | Fellows | G06N 7/01 |
| 2005/0021360 | A1 * | 1/2005 | Miller | G06Q 10/08 705/7.28 |
| 2016/0173521 | A1 | 6/2016 | Yampolskiy et al. | |
| 2021/0067536 | A1 * | 3/2021 | Mylrea | H04L 9/3239 |

FOREIGN PATENT DOCUMENTS

| | | | | |
|---|---|---|---|---|
| DE | 102018123197 | A1 * | 3/2019 | G06F 21/78 |
| EP | 4184870 | A1 * | 5/2023 | H04L 63/1425 |
| KR | 10-2015-0070331 | A | 6/2015 | |
| KR | 10-1775517 | B1 | 9/2017 | |
| KR | 10-2018-0007832 | A | 1/2018 | |
| KR | 10-2433928 | B1 | 8/2022 | |
| KR | 10-2578059 | B1 | 9/2023 | |
| KR | 10-2024-0079843 | A | 6/2024 | |
| KR | 20240104059 | A * | 7/2024 | H04L 63/20 |
| KR | 20240106841 | A * | 7/2024 | G06F 1/1647 |
| KR | 102742190 | B1 * | 12/2024 | H04L 63/20 |
| KR | 10-2767026 | B1 | 2/2025 | |
| WO | WO-2022046652 | A1 * | 3/2022 | H04L 63/1483 |

* cited by examiner

*Primary Examiner* — Kostas J Katsikis
(74) *Attorney, Agent, or Firm* — The PL Law Group, PLLC

(57) ABSTRACT

In a cybersecurity assessment method for ship assets, a risk level of each asset on a ship is automatically evaluated using asset-related information as input, and for an asset whose risk level exceeds a preset threshold, a security-control configuration set is generated and output. Accordingly, even when assets on the ship or network configurations change, a risk state can be rapidly re-evaluated and necessary security measures can be consistently derived.

12 Claims, 16 Drawing Sheets

FIG. 3

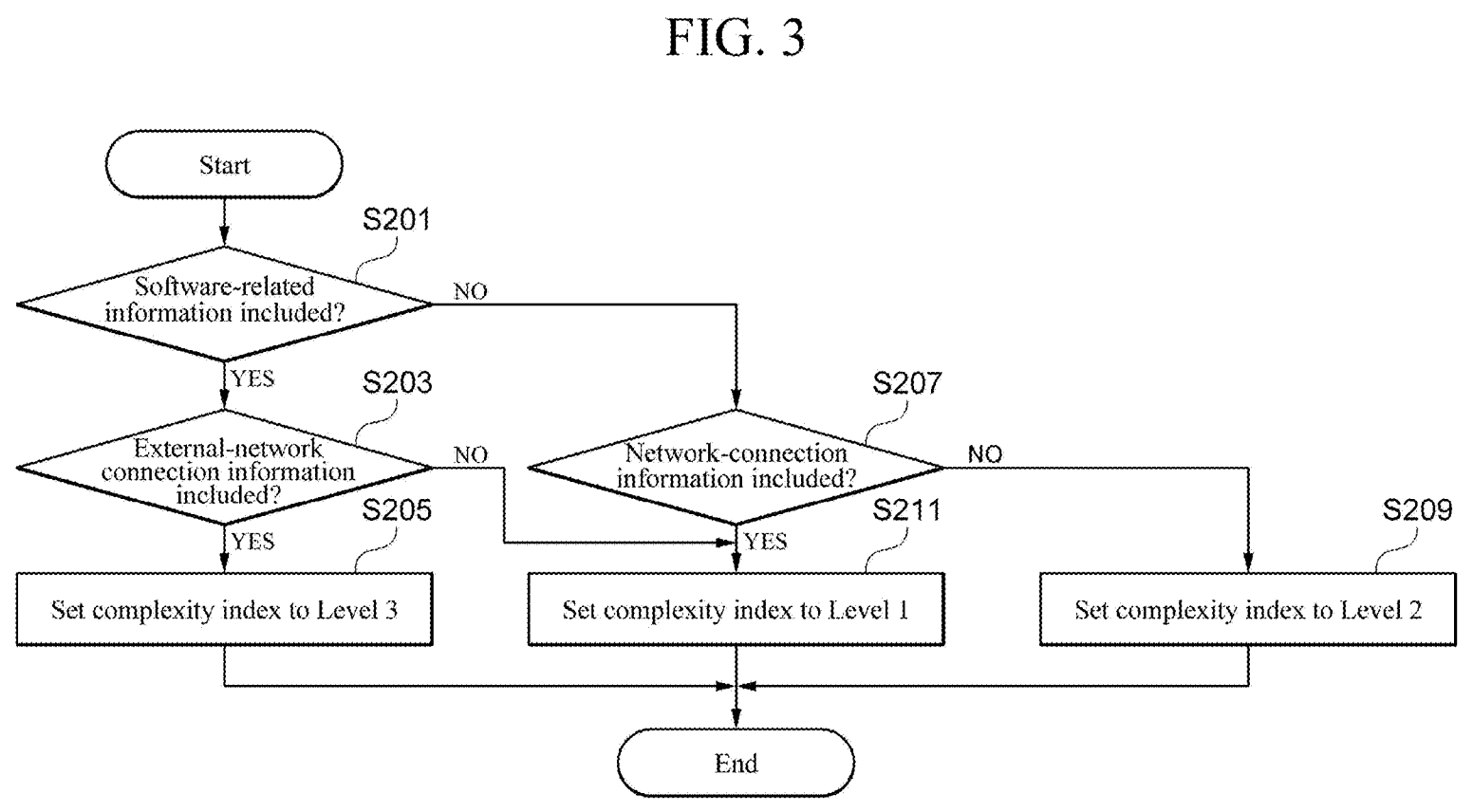

Start

S201
Software-related information included?
YES
NO

S203
External-network connection information included?
YES
NO

S205
Set complexity index to Level 3

S207
Network-connection information included?
YES
NO

S211
Set complexity index to Level 1

S209
Set complexity index to Level 2

End

FIG. 9

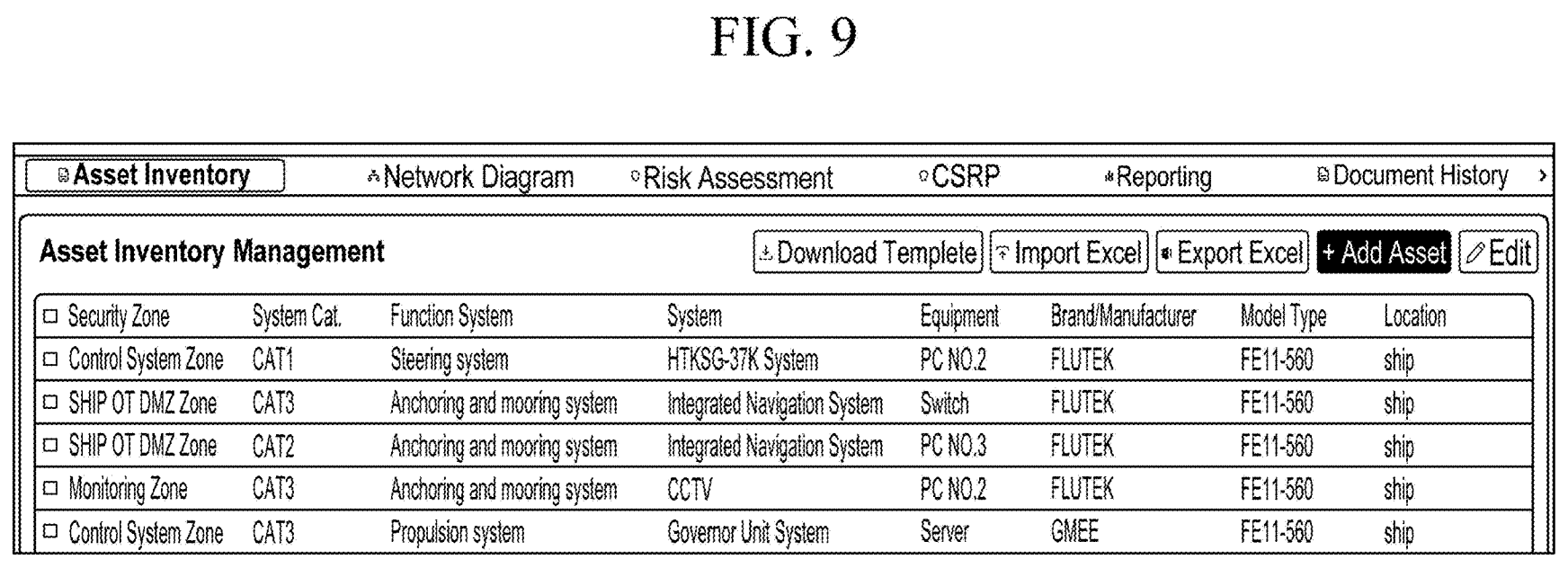

Asset Inventory | Network Diagram | Risk Assessment | CSRP | Reporting | Document History

Asset Inventory Management

Download Templete | Import Excel | Export Excel | + Add Asset | Edit

| Security Zone | System Cat. | Function System | System | Equipment | Brand/Manufacturer | Model Type | Location |
|---|---|---|---|---|---|---|---|
| Control System Zone | CAT1 | Steering system | HTKSG-37K System | PC NO.2 | FLUTEK | FE11-560 | ship |
| SHIP OT DMZ Zone | CAT3 | Anchoring and mooring system | Integrated Navigation System | Switch | FLUTEK | FE11-560 | ship |
| SHIP OT DMZ Zone | CAT2 | Anchoring and mooring system | Integrated Navigation System | PC NO.3 | FLUTEK | FE11-560 | ship |
| Monitoring Zone | CAT3 | Anchoring and mooring system | CCTV | PC NO.2 | FLUTEK | FE11-560 | ship |
| Control System Zone | CAT3 | Propulsion system | Governor Unit System | Server | GMEE | FE11-560 | ship |

FIG. 10

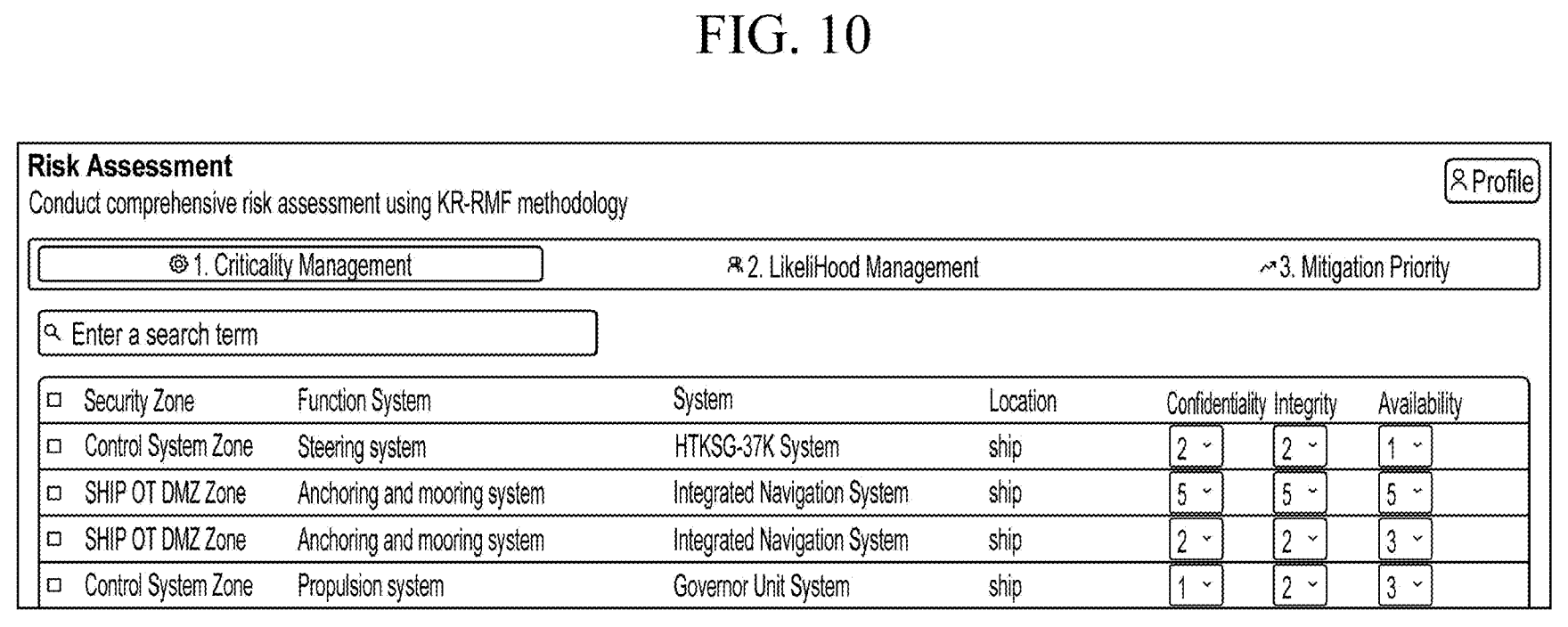

Risk Assessment

Conduct comprehensive risk assessment using KR-RMF methodology

Profile

1. Criticality Management | 2. LikeliHood Management | 3. Mitigation Priority

Enter a search term

| Security Zone | Function System | System | Location | Confidentiality | Integrity | Availability |
|---|---|---|---|---|---|---|
| Control System Zone | Steering system | HTKSG-37K System | ship | 2 | 2 | 1 |
| SHIP OT DMZ Zone | Anchoring and mooring system | Integrated Navigation System | ship | 5 | 5 | 5 |
| SHIP OT DMZ Zone | Anchoring and mooring system | Integrated Navigation System | ship | 2 | 2 | 3 |
| Control System Zone | Propulsion system | Governor Unit System | ship | 1 | 2 | 3 |

FIG. 11

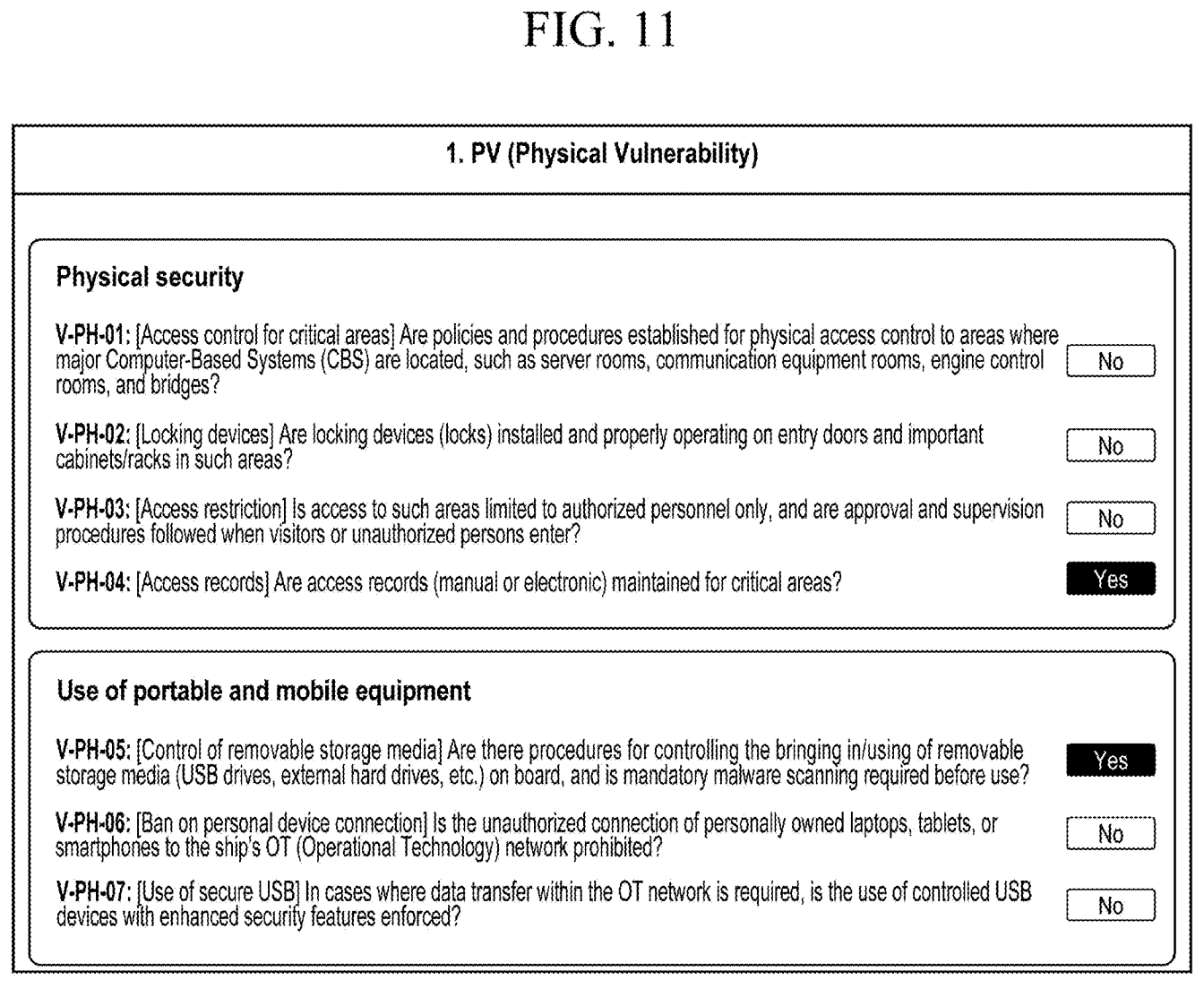

1. PV (Physical Vulnerability)

Physical security

V-PH-01: [Access control for critical areas] Are policies and procedures established for physical access control to areas where major Computer-Based Systems (CBS) are located, such as server rooms, communication equipment rooms, engine control rooms, and bridges? No

V-PH-02: [Locking devices] Are locking devices (locks) installed and properly operating on entry doors and important cabinets/racks in such areas? No

V-PH-03: [Access restriction] Is access to such areas limited to authorized personnel only, and are approval and supervision procedures followed when visitors or unauthorized persons enter? No

V-PH-04: [Access records] Are access records (manual or electronic) maintained for critical areas? Yes

Use of portable and mobile equipment

V-PH-05: [Control of removable storage media] Are there procedures for controlling the bringing in/using of removable storage media (USB drives, external hard drives, etc.) on board, and is mandatory malware scanning required before use? Yes

V-PH-06: [Ban on personal device connection] Is the unauthorized connection of personally owned laptops, tablets, or smartphones to the ship's OT (Operational Technology) network prohibited? No

V-PH-07: [Use of secure USB] In cases where data transfer within the OT network is required, is the use of controlled USB devices with enhanced security features enforced? No

FIG. 12

Enter a search term

100% 100%

| Security Zone | Function System | System | Location | Connectivity | Complexity | PV | TV | Risk Level |
|---|---|---|---|---|---|---|---|---|
| Control System Zone | Steering system | HTKSG-80L | Ship | CY3 | CX2 | 85% | 44% | Medium |
| Control System Zone | Propulsion system | Governor Unit system | Ship | CY1 | CX1 | 62% | 33% | Low |
| SHIP OT DMZ Zone | Anchoring and mooring system | Integrated Navigation system | Ship | CY1 | CX1 | 69% | 0% | Low |
| Control System Zone | Steering system | HTKSG-37K System | Ship | CY2 | CX1 | 77% | 67% | Low |
| SHIP OT DMZ Zone | Anchoring and mooring system | Integrated Navigation system | Ship | CY5 | CX3 | 100% | 58% | High |

FIG. 13

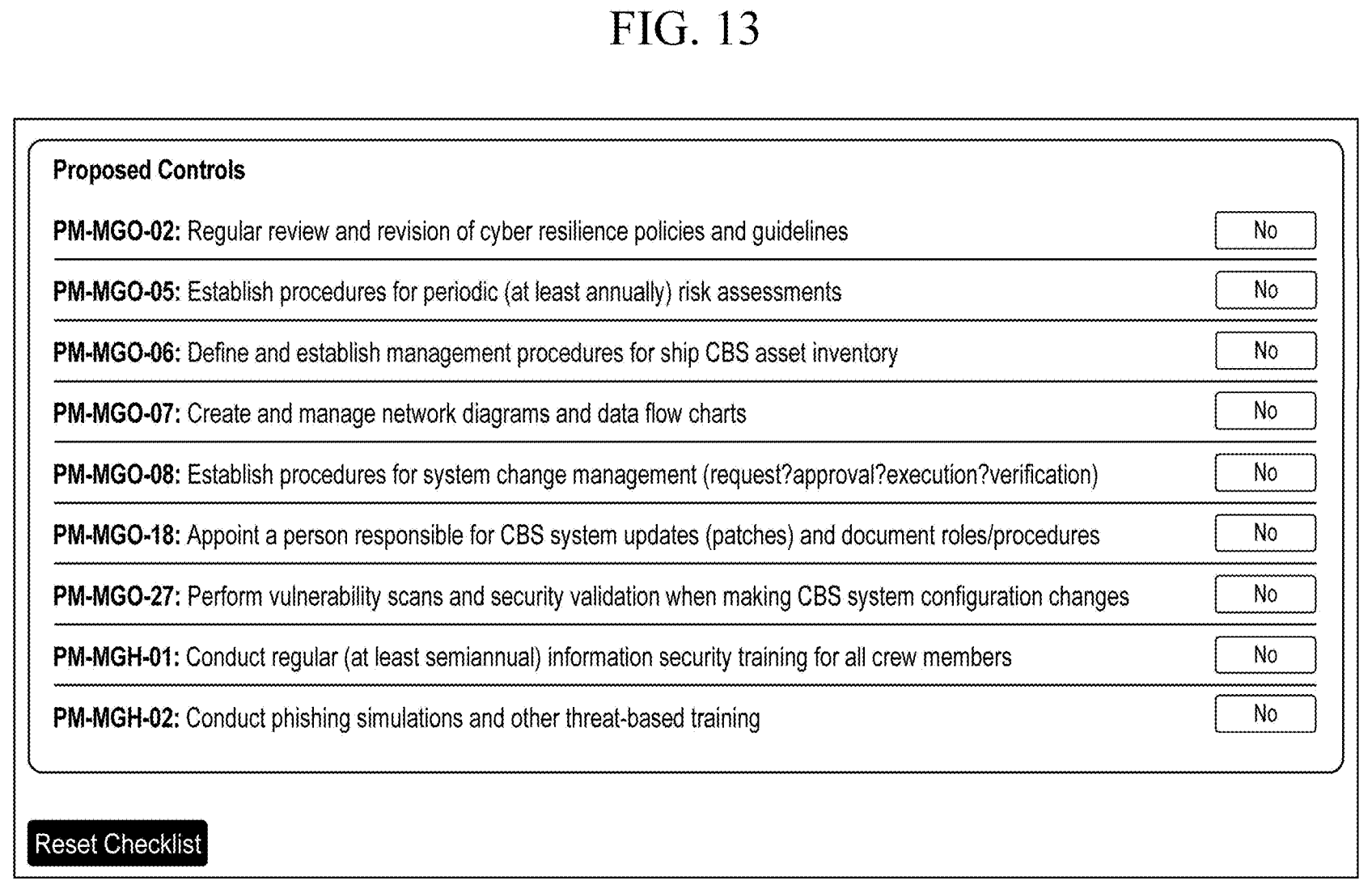

Proposed Controls

PM-MGO-02: Regular review and revision of cyber resilience policies and guidelines — No

PM-MGO-05: Establish procedures for periodic (at least annually) risk assessments — No

PM-MGO-06: Define and establish management procedures for ship CBS asset inventory — No

PM-MGO-07: Create and manage network diagrams and data flow charts — No

PM-MGO-08: Establish procedures for system change management (request?approval?execution?verification) — No

PM-MGO-18: Appoint a person responsible for CBS system updates (patches) and document roles/procedures — No

PM-MGO-27: Perform vulnerability scans and security validation when making CBS system configuration changes — No

PM-MGH-01: Conduct regular (at least semiannual) information security training for all crew members — No

PM-MGH-02: Conduct phishing simulations and other threat-based training — No Reset Checklist

FIG. 14

| ☐ Security Zone | Function System | System | Location | Risk Level | Proposed Controls | | RRL | Priority | When To Apply |
|---|---|---|---|---|---|---|---|---|---|
| ☐ Control System Zone | Steering system | HTKSG-80L | Ship | Unknown | Processing | Accept | Unknown | Apply | Unknown |
| ☐ SHIP OT DMZ Zone | Anchoring and mooring system | Integrated Navigation system | Ship | High | Processing | Accept | Medium | Apply | Unknown |
| ☐ Monitoring Zone | Anchoring and mooring system | CCTV | Ship | Unknown | Processing | Accept | Unknown | Apply | Unknown |
| ☐ Control System Zone | Steering system | HTKSG-80L | Ship | Unknown | Processing | Accept | Unknown | Apply | Unknown |
| ☐ SHIP OT DMZ Zone | Anchoring and mooring system | Integrated Navigation system | Ship | Unknown | Processing | Accept | Unknown | Apply | Unknown |
| ☐ Control System Zone | Steering system | HTKSG-37K System | Ship | Unknown | Processing | Accept | Unknown | Apply | Unknown |
| ☐ SHIP OT DMZ Zone | Anchoring and mooring system | Integrated Navigation system | Ship | Medium | Processing | Accept | Low | Apply | Unknown |
| ☐ Monitoring Zone | Anchoring and mooring system | CCTV | Ship | Unknown | Processing | Accept | Unknown | Apply | Unknown |
| ☐ Control System Zone | Propulsion system | Governor Unit System | Ship | Low | Processing | Accept | Low | Apply | Unknown |
| ☐ Control System Zone | Steering system | HTKSG-37K System | Ship | Unknown | Processing | Accept | Unknown | Apply | Unknown |

FIG. 15

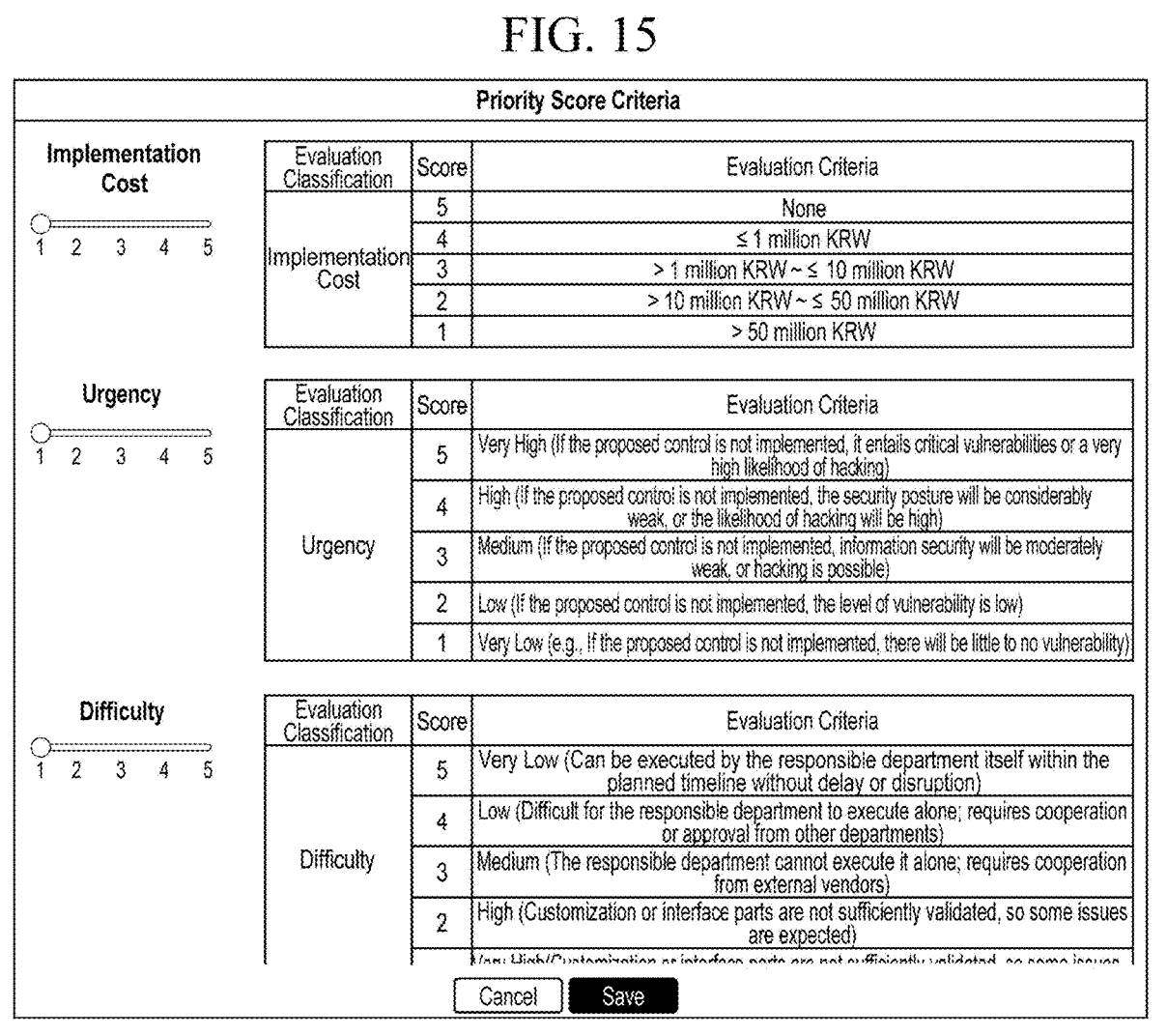

Priority Score Criteria

Implementation Cost

1 2 3 4 5

| Evaluation Classification | Score | Evaluation Criteria |
|---|---|---|
| Implementation Cost | 5 | None |
| | 4 | ≤ 1 million KRW |
| | 3 | > 1 million KRW ~ ≤ 10 million KRW |
| | 2 | > 10 million KRW ~ ≤ 50 million KRW |
| | 1 | > 50 million KRW |

Urgency

1 2 3 4 5

| Evaluation Classification | Score | Evaluation Criteria |
|---|---|---|
| Urgency | 5 | Very High (If the proposed control is not implemented, it entails critical vulnerabilities or a very high likelihood of hacking) |
| | 4 | High (If the proposed control is not implemented, the security posture will be considerably weak, or the likelihood of hacking will be high) |
| | 3 | Medium (If the proposed control is not implemented, information security will be moderately weak, or hacking is possible) |
| | 2 | Low (If the proposed control is not implemented, the level of vulnerability is low) |
| | 1 | Very Low (e.g., If the proposed control is not implemented, there will be little to no vulnerability) |

Difficulty

1 2 3 4 5

| Evaluation Classification | Score | Evaluation Criteria |
|---|---|---|
| Difficulty | 5 | Very Low (Can be executed by the responsible department itself within the planned timeline without delay or disruption) |
| | 4 | Low (Difficult for the responsible department to execute alone; requires cooperation or approval from other departments) |
| | 3 | Medium (The responsible department cannot execute it alone; requires cooperation from external vendors) |
| | 2 | High (Customization or interface parts are not sufficiently validated, so some issues are expected) |

Cancel Save

FIG. 16

| Risk Level | Proposed Controls | | RRL | Priority | When To Apply |
|---|---|---|---|---|---|
| Low | Processing | Accept | Unknown | Apply | Quick-Win |
| High | Processing | Accept | Medium | Apply | Short Term |
| Unknown | Processing | Accept | Unknown | Apply | Unknown |
| Low | Processing | Accept | Unknown | Apply | Quick-Win |
| Low | Processing | Accept | Unknown | Apply | Mid Term |
| Medium | Processing | Accept | Low | Apply | Long Term |

CYBERSECURITY ASSESSMENT METHOD FOR SHIP ASSETS AND COMPUTING DEVICE FOR PERFORMING SAME

CROSS-REFERENCE TO RELATED APPLICATIONS AND CLAIM OF PRIORITY

This application claims the benefit under 35 U.S.C. § 119 of Korean Patent Application Nos. 10-2025-0160565, 10-2025-0160566, and 10-2025-0160567, each filed on Oct. 30, 2025, and Korean Patent Application No. 10-2025-0193200, filed on Dec. 8, 2025, in the Korean Intellectual Property Office, the entire disclosure of each of which are incorporated herein by reference for all purposes.

BACKGROUND

1. Field

Embodiments of the present disclosure relate to a cybersecurity assessment method for ship assets and a computing device for performing the same.

2. Description of Related Art

Unlike information-technology (IT) networks, operating and control environments on a ship may include numerous operational-technology (OT) assets, and communications among assets may employ heterogeneous physical interfaces and protocols, such as Ethernet-based communications and serial-based communications. In addition, even within the same ship, network zones to which assets connect may be separated into trusted networks and untrusted networks, or interconnection with external networks may be permitted only in a limited manner. Accordingly, the attack surface and the likelihood of compromise may be formed differently depending on a communication destination address (e.g., an internal-range IP address vs. an external-range IP address) and a type of network connection. However, conventional ship-asset security assessments tend to treat ship assets only as individual items, or have difficulty consistently reflecting, in an assessment process, network-connection characteristics, internal/external distinction of destination addresses, and whether a trusted/untrusted zone interconnection exists.

Further, information on ship assets may be managed in different formats depending on a manufacturer, a model, an installation environment, and the like, and an asset identifier, software configuration information, a communication protocol, network-connection information, and destination-address information and the like may be omitted or recorded in an unstructured form. For example, fields having the same meaning may be written with different notations, or a network-interface type (serial/Ethernet) or external-network connection information may be unclear. In a process in which an evaluator manually normalizes and interprets such heterogeneous and incomplete asset information, errors or omissions may occur, and as a result, assessment criteria may differ for the same or similar assets, thereby degrading reproducibility and consistency of assessment results.

In addition, actual failures or abnormal symptoms on a ship may be observed through operational data such as event logs, alarms, and failure records that occur during operation, but conventional security-assessment approaches do not systematically reflect such event logs. As a result, types of incidents that repeatedly occur in a particular ship or operating environment (e.g., abnormal traffic through an external interconnection path, control failures of a specific function group, and the like) may not be sufficiently reflected in the assessment, and assessment results may not match actual operating risk patterns.

Examples of related art include Korean Patent Registration No. 10-2433928 (issued Aug. 19, 2022).

SUMMARY

Embodiments of the present disclosure provide a new technique for cybersecurity assessment of ship assets.

According to one embodiment, a method is performed by a computing device including one or more processors and a memory storing one or more programs to be executed by the one or more processors. The method includes: obtaining asset inventory data including asset-related information for each asset existing in a ship that is a target of cybersecurity assessment, the asset inventory data including at least one of identification information of an asset, network-connection information, network-interface information, an installation location of the asset, an operating system (OS) version, a firmware version, a software version, a communication protocol, an IP/MAC address, a certificate, and an update log; verifying whether any required field is missing in the asset inventory data and normalizing the asset-related information by converting the asset inventory data into a preset standard format; automatically calculating, for each asset, a basic assessment-factor index including a complexity index, a connectivity index, and a threat index by inputting the asset-related information into an algorithm or rule set defined for each basic assessment factor; calculating, based on the calculated complexity index, connectivity index, and threat index, security-factor scores including a Confidentiality score, an Integrity score, and an Availability score; calculating, for each asset, a vulnerability index based on user answers to a vulnerability checklist for assets on the ship; evaluating a risk level of each asset on the ship based on the basic assessment-factor index, the security-factor scores, and the vulnerability index; generating, for an asset whose risk level exceeds a preset threshold, a security-control configuration set including at least one of a network segmentation policy, an access control list (ACL), a firewall rule, a monitoring target, and hardening configuration items; and transmitting the security-control configuration set to a security management system of the ship.

In some embodiments, calculating the security-factor scores includes expressing each of the Confidentiality score, the Integrity score, and the Availability score as a weighted sum of the complexity index, the connectivity index, and the threat index, where a first weight is applied to the complexity index, a second weight is applied to the connectivity index, and a third weight is applied to the threat index, and where the first weight, the second weight, and the third weight are set differently for calculation of the Confidentiality score, the Integrity score, and the Availability score.

In some embodiments, in calculating the Confidentiality score, the weights are set in an order of second weight>first weight>third weight; in calculating the Integrity score, the weights are set in an order of third weight>second weight>first weight; and in calculating the Availability score, the third weight is higher than the first weight and the second weight.

In some embodiments, the method further includes: collecting event logs related to incidents, failures, and pre-incident indicators occurring in each asset during operation of the ship; estimating correlation coefficients between types of security factors and the basic assessment-factor indices based on the collected event logs; and automatically calibrating sensitivity of security-factor score calculation by adjusting the first weight, the second weight, and the third weight based on the estimated correlation coefficients as operating data accumulates.

In some embodiments, calculating the complexity index includes: determining whether the asset-related information includes software-related information of the asset; when the software-related information is included, determining whether the asset-related information includes external-network connection information; when the external-network connection information is included, setting the complexity index for the asset to a third level; when the software-related information is not included, determining whether the asset-related information includes network-connection information; when the network-connection information is not included, setting the complexity index for the asset to a first level; and when the network-connection information is included but is not external-network connection information, setting the complexity index for the asset to a second level.

In some embodiments, calculating the connectivity index includes: determining, based on the asset-related information, whether the asset is connected to an untrusted network; when the asset is connected to the untrusted network, setting the connectivity index for the asset to a fifth level; when the asset is not connected to the untrusted network, determining whether the asset is connected to another trusted network; when the asset is not connected to the other trusted network, setting the connectivity index for the asset to a first level; when the asset is connected to the other trusted network, if a physical interface connected to the other trusted network is serial-based communication, setting the connectivity index for the asset to a second level; and when the physical interface connected to the other trusted network is Ethernet-based communication, if a destination address of the Ethernet-based communication is an internal-range IP address, setting the connectivity index for the asset to a third level, and if the destination address is an external-range IP address, setting the connectivity index for the asset to a fourth level.

In some embodiments, calculating the threat index includes: classifying a functional group of each asset on the ship based on the asset-related information; classifying a control level of each asset based on the asset-related information; classifying whether each asset is risk-linked based on the asset-related information; and calculating the threat index of each asset based on the functional group, the control level, and whether the asset is risk-linked.

In some embodiments, the method further includes: providing, based on the vulnerability checklist, a list of protective measures applicable by a user; re-evaluating the risk level of the asset by reflecting a risk-reduction score assigned to each protective measure when the protective measure is applied; and updating and outputting the security-control configuration set based on results of the re-evaluation.

In some embodiments, the method further includes determining an application priority among protective measures included in the protective-measure list, where the application priority is determined based on at least one of an implementation cost, urgency, and difficulty for each protective measure.

In some embodiments, determining the application priority includes: assigning a first priority score according to an implementation cost of each protective measure; assigning a second priority score according to urgency of each protective measure; assigning a third priority score according to difficulty of each protective measure; and summing the first, second, and third priority scores for each protective measure to obtain a total priority score and determining the application priority according to the total priority score.

According to another embodiment, a computing device includes a processor and a memory storing one or more programs to be executed by the processor, wherein, when executed, the one or more programs cause the processor to: obtain asset inventory data including asset-related information for each asset existing in a ship that is a target of cybersecurity assessment, the asset inventory data including at least one of identification information of an asset, network-connection information, network-interface information, an installation location of the asset, an operating system (OS) version, a firmware version, a software version, a communication protocol, an IP/MAC address, a certificate, and an update log; verify whether any field is missing in the asset inventory data and normalize the asset-related information by converting the asset inventory data into a preset standard format; for each asset, automatically calculate a basic assessment-factor index including a complexity index, a connectivity index, and a threat index by inputting the asset-related information into an algorithm or rule set defined for each basic assessment factor; calculate, based on the calculated complexity index, connectivity index, and threat index, security-factor scores including a Confidentiality score, an Integrity score, and an Availability score; calculate, for each asset, a vulnerability index based on user answers to a vulnerability checklist for assets on the ship; evaluate a risk level of each asset on the ship based on the basic assessment-factor index, the security-factor scores, and the vulnerability index; generate, for an asset whose risk level exceeds a preset threshold, a security-control configuration set including at least one of a network segmentation policy, an access control list (ACL), a firewall rule, a monitoring target, and hardening configuration items; and transmit the security-control configuration set to a security management system of the ship.

BRIEF DESCRIPTION OF THE DRAWINGS

FIG. 3 is a flowchart illustrating a process of calculating a complexity index according to one embodiment of the present disclosure.

FIG. 9 illustrates a state in which a user-providing module receives asset-related information according to one embodiment of the present disclosure.

FIG. 10 illustrates a screen displaying security-factor scores of each asset according to one embodiment of the present disclosure.

FIG. 11 illustrates a screen providing a portion of a physical vulnerability checklist to a user according to one embodiment of the present disclosure.

FIG. 12 illustrates a screen providing a risk level of each asset according to one embodiment of the present disclosure.

FIG. 13 illustrates a screen providing a portion of a protective-measure list according to one embodiment of the present disclosure.

FIG. 14 illustrates a screen providing a re-evaluated risk level (RRL) of an asset according to one embodiment of the present disclosure.

FIG. 15 illustrates a screen providing criteria of implementation cost, urgency, and difficulty for determining an application priority for each protective measure according to one embodiment of the present disclosure.

FIG. 16 illustrates a screen providing an application timing for each protective measure according to one embodiment of the present disclosure.

DETAILED DESCRIPTION

Hereinafter, embodiments of the present disclosure will be described in detail with reference to the drawings. The following description is provided to assist a comprehensive understanding of methods, devices, and/or systems described herein. However, the description is merely illustrative, and the present disclosure is not limited thereto.

In describing embodiments of the present disclosure, detailed descriptions of well-known technologies may be omitted when they are deemed to unnecessarily obscure the gist of the present disclosure. Terms used below are defined in consideration of their functions in the present disclosure and may vary depending on user intent, operator intent, or custom. Accordingly, definitions of the terms should be made based on the overall content of this specification. The singular forms include the plural forms unless the context clearly indicates otherwise. As used herein, expressions such as "include" or "comprise" indicate the presence of stated features, numbers, steps, operations, elements, parts thereof, or combinations thereof, and do not exclude the presence or possibility of one or more other features, numbers, steps, operations, elements, parts thereof, or combinations thereof.

Terms such as "first" and "second" may be used to describe various elements, but the elements should not be limited by these terms. These terms are used only to distinguish one element from another. For example, a first element may be named a second element and similarly a second element may be named a first element, without departing from the scope of the present disclosure.

Figure 1:
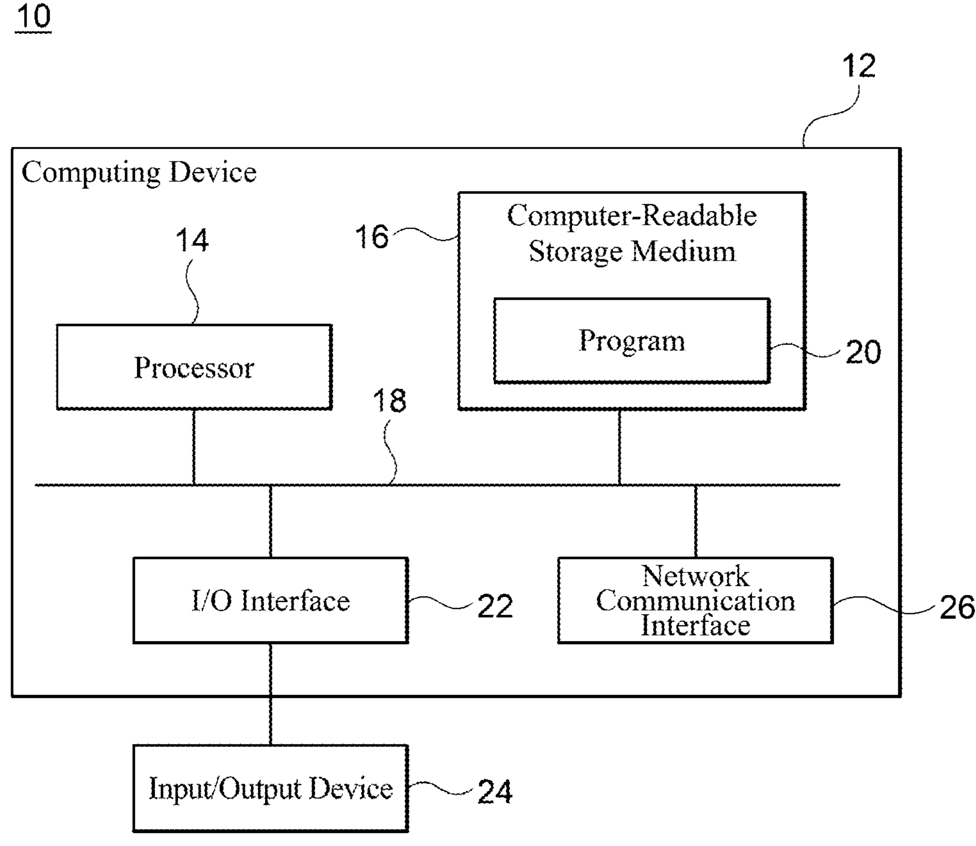
FIG. 1 is a block diagram illustrating a computing environment including a computing device suitable for use in exemplary embodiments.

FIG. 1 is a block diagram illustrating a computing environment 10 including a computing device suitable for use in exemplary embodiments. In the illustrated embodiment, each component may have different functions and capabilities than those described below, and may include additional components.

The computing environment 10 includes a computing device 12. In one embodiment, the computing device 12 is configured to perform cybersecurity assessment related to assets on a ship.

The computing device 12 includes at least one processor 14, a computer-readable storage medium 16, and a communication bus 18. The processor 14 may cause the computing device 12 to operate according to exemplary embodiments described herein. For example, the processor 14 may execute one or more programs stored in the computer-readable storage medium 16. The one or more programs may include one or more computer-executable instructions that, when executed by the processor 14, configure the computing device 12 to perform operations according to exemplary embodiments.

The computer-readable storage medium 16 is configured to store computer-executable instructions or program code, program data, and/or other suitable forms of information. A program 20 stored in the computer-readable storage medium 16 includes a set of instructions executable by the processor 14. In one embodiment, the computer-readable storage medium 16 may include memory (e.g., volatile memory such as random-access memory (RAM), non-volatile memory, or a suitable combination thereof), one or more magnetic disk storage devices, optical disk storage devices, flash memory devices, other forms of storage media accessible by the computing device 12 and capable of storing desired information, or a suitable combination thereof.

The communication bus 18 interconnects various components of the computing device 12, including the processor 14 and the computer-readable storage medium 16.

The computing device 12 may further include one or more I/O interfaces 22 providing an interface for one or more input/output devices 24 and one or more network communication interfaces 26. The I/O interfaces 22 and the network communication interfaces 26 are connected to the communication bus 18. The input/output devices 24 may be connected to other components of the computing device 12 through the I/O interfaces 22. Exemplary input/output devices 24 include input devices such as a pointing device (e.g., mouse or trackpad), keyboard, touch input device (e.g., touchpad or touchscreen), voice or sound input device, various sensors and/or imaging devices, and/or output devices such as a display device, printer, speaker, and/or network card. The input/output devices 24 may be included within the computing device 12 as internal components, or may be separate devices connected to the computing device 12.

Figure 2:
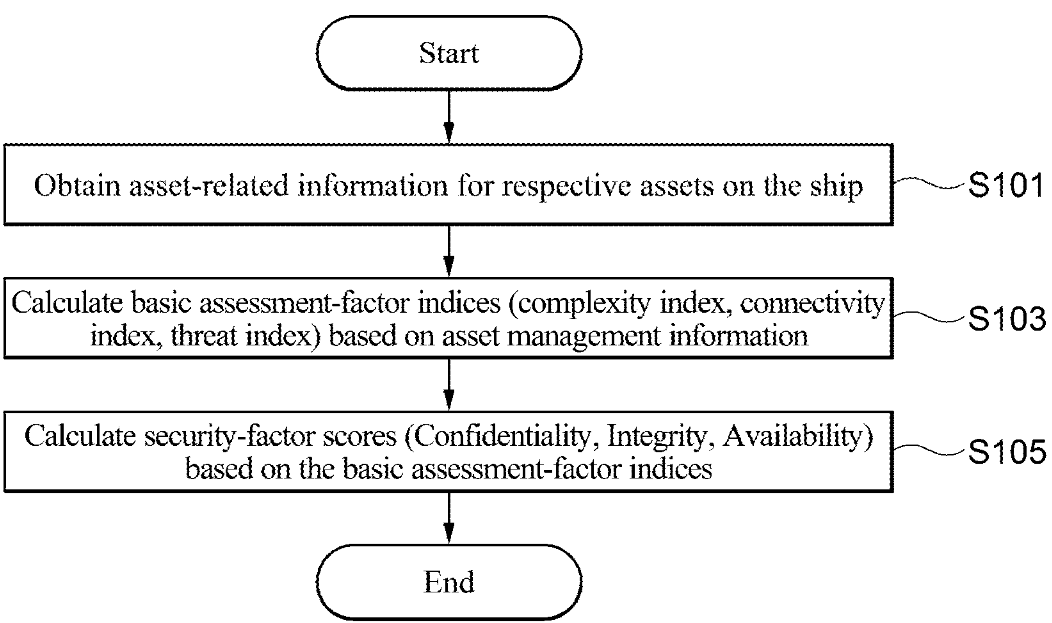
FIG. 2 is a flowchart illustrating a security assessment method for ship assets according to one embodiment of the present disclosure.

FIG. 2 is a flowchart illustrating a security assessment method for ship assets according to one embodiment. Although FIG. 2 shows the method as divided into multiple steps, at least some steps may be performed in a different order, combined with other steps, omitted, subdivided, or supplemented with one or more additional steps not shown.

Referring to FIG. 2, the computing device 12 may obtain asset-related information for each asset existing on a ship that is a target of cybersecurity assessment (S101).

Here, an asset may include various systems or facilities used to operate a ship. For example, assets may include a navigation communication system, a fire detection and extinguishing system, a propulsion system, a steering system, a power generation and distribution system, a watertight integrity and flooding detection system, a lighting system, and safety systems.

Asset-related information may include, for each asset, a name (system name or facility name), manufacturer, model or type, identifier (ID), installation location, OS version, firmware version, software version, network-connection status (including external-network connection, internal-network connection, trusted-network connection, and untrusted-network connection), network interface, communication protocol, IP/MAC address, certificate, update log, and/or interfaces with other systems. In one embodiment, the computing device 12 may receive, as input, an asset data file that follows an asset inventory standard of the International Association of Classification Societies (IACS). The asset data file may include asset-related information for each asset.

The computing device 12 may generate asset records from the input asset data file and verify whether required fields of the asset records (e.g., asset identifier (ID), network interface, communication protocol, IP/MAC address, and network-connection status) are missing. When missing or unstructured fields exist, the computing device 12 may convert the fields into a standard format according to predefined normalization rules (e.g., address-format standardization) and/or generate complementary values using other fields that can be cross-referenced (e.g., interface information and communication protocol). Accordingly, consistency of asset-related information may be ensured even in an environment where assets from different manufacturers/models coexist.

The computing device 12 may also construct connection relationship information representing communication relationships among assets using network-connection attributes and destination-address information contained in the asset records. For example, based on whether an asset is connected to a trusted network or an untrusted network, whether a physical interface is serial-based communication or Ethernet-based communication, and whether a destination address of Ethernet-based communication is an internal-range IP address or an external-range IP address, the computing device 12 may assign different connectivity-index levels. Such connection relationship information may be used as input in subsequent steps to reflect an extent to which an attack surface may expand or a cascading impact may occur.

Next, the computing device 12 may calculate basic assessment-factor indices for cybersecurity assessment based on asset-related information for each asset (S103). In one embodiment, the basic assessment-factor indices include a complexity index, a connectivity index, and a threat index.

The complexity index indicates how complex a security scheme for the asset is. The connectivity index indicates how organically the asset is connected with other assets. The threat index indicates how threatening a failure of the asset is to human safety and ship safety.

The computing device 12 may automatically calculate the complexity index, the connectivity index, and the threat index by inputting asset-related information for each asset into an algorithm or rule set defined for each basic assessment factor. In one embodiment, the complexity index may be classified into a first level, a second level, and a third level, where a higher level indicates higher complexity of the security scheme. The connectivity index may be classified into a first level through a fifth level, where a higher level indicates higher interconnection with other assets. The threat index may be classified into a first level through a third level, where a higher level indicates higher threat of the asset failure.

Details of calculating the basic assessment-factor indices are described later with reference to FIGS. 3 to 5.

Next, the computing device 12 may calculate security-factor scores based on the basic assessment-factor indices (i.e., the complexity index, the connectivity index, and the threat index) (S105).

A security-factor score refers to a score for a security factor used to evaluate an impact of results when a cyber threat or cyberattack occurs for each asset. Security factors include Confidentiality, Integrity, and Availability. Thus, the security-factor scores include a Confidentiality score, an Integrity score, and an Availability score.

In disclosed embodiments, the security-factor scores (Confidentiality, Integrity, and Availability) may be automatically calculated based on the basic assessment-factor indices (complexity, connectivity, and threat).

Specifically, the computing device 12 may calculate the Confidentiality score, the Integrity score, and the Availability score for an asset according to the asset's complexity index, connectivity index, and threat index. Each of the Confidentiality score, the Integrity score, and the Availability score may be expressed as a sum (e.g., a weighted sum) of the complexity index, the connectivity index, and the threat index. A first weight may be applied to the complexity index, a second weight may be applied to the connectivity index, and a third weight may be applied to the threat index. In one embodiment, the first, second, and third weights may be set differently when calculating the Confidentiality score, the Integrity score, and the Availability score.

For example, the Confidentiality score (C) may be calculated according to Equation 1 below.

$$C = \alpha \cdot (\text{complexity index}) + \beta \cdot (\text{connectivity index}) + \gamma \cdot (\text{threat index}) + \gamma \cdot (\text{threat index}), \text{ where } \beta > \alpha > \gamma,$$
$$\alpha\text{: first weight, } \beta\text{: second weight, } \gamma\text{: third weight.} \quad \text{[Equation 1]}$$

That is, when calculating the Confidentiality score, the computing device 12 may assign the weights in an order of β, α, γ.

The Integrity score (I) may be calculated according to Equation 2 below.

$$I = \alpha \cdot (\text{complexity index}) + \beta \cdot (\text{connectivity index}) + \gamma \cdot (\text{threat index}), \text{ where } \gamma > \beta > \alpha \quad \text{[Equation 2]}$$

That is, when calculating the Integrity score, the computing device 12 may assign the weights in an order of γ, β, α.

The Availability score (A) may be calculated according to Equation 3 below.

$$A = \alpha \cdot (\text{complexity index}) + \beta \cdot (\text{connectivity index}) + \gamma \cdot (\text{threat index}), \text{ where } \gamma > \beta \text{ and } \gamma > \alpha \quad \text{[Equation 3]}$$

That is, when calculating the Availability score, the computing device 12 may assign a higher weight to γ than to α and β. In this case, α and β may be equal, but are not limited thereto.

According to disclosed embodiments, the basic assessment-factor indices (complexity, connectivity, and threat) can be automatically calculated using asset-related information for each asset on a ship as input, and the security-factor scores (Confidentiality, Integrity, and Availability) can be automatically calculated based on the basic assessment-factor indices. Thus, cybersecurity assessment of a ship does not need to rely on an evaluator's experience and intuition, thereby enabling consistent assessment for the same asset and reliable assessment even when asset-related information changes.

Meanwhile, the computing device 12 may collect event logs related to incidents, failures, and pre-incident indicators occurring in each asset during operation of the ship. Based on the collected event logs, the computing device 12 may analyze, in the basic assessment-factor indices of each asset, what types of incidents occurred and how frequently they occurred. That is, the computing device 12 may analyze, for a given combination of complexity/connectivity/threat index levels, what types of incidents occurred and how frequently they occurred.

Based on analysis results, the computing device 12 may adjust the first, second, and third weights used to calculate the Confidentiality, Integrity, and Availability scores. In one embodiment, each event log may include identification information (ID) of the asset, the asset's basic assessment-factor indices, and a type of security factor affected by the incident (i.e., which of Confidentiality, Integrity, and Availability is compromised or degraded by the incident).

The computing device 12 may estimate correlation coefficients between the type of security factor affected by an incident and the basic assessment-factor indices based on the collected event logs. In one embodiment, the computing device 12 may estimate the correlation coefficients using logistic regression, Poisson regression, or the like, but is not limited thereto. The computing device 12 may adjust the first, second, and third weights based on the estimated correlation coefficients. In this case, the computing device 12 may aggregate logs over a predetermined period (e.g., the most recent N days or the most recent N voyages) or perform weight adjustment only when a minimum sample-size condition is satisfied, thereby suppressing excessive variation in the weights. Through this approach, sensitivity of security-factor score calculation can be automatically calibrated as operating data accumulates.

By combining automatic normalization of ship-asset inventory input, index calculation based on network-connection attributes, and weight adjustment based on event logs, the disclosed embodiments improve automation and reproducibility of ship-security assessment processing and reduce processing load for re-assessment when assets or network configurations change. In other words, rather than merely displaying information or performing simple score calculations, the disclosed embodiments provide a technical processing pipeline that automatically generates security assessments and subsequent control configurations based on ship network configuration and operating data.

FIG. 3 is a flowchart illustrating a process of calculating a complexity index according to one embodiment. Although the illustrated flowchart describes the method as a plurality of steps, at least some of the steps may be performed in a different order, performed in combination with other steps, omitted, divided into sub-steps, or performed with one or more additional steps not shown.

Referring to FIG. 3, the computing device 12 may determine whether asset-related information includes software-related information of the asset (S201). Software-related information may include at least one of an OS version, a firmware version, and a software version.

When the software-related information is included, the computing device 12 may determine whether the asset-related information includes external-network connection information (S203). External-network connection information may indicate that the asset is connected to another external system or network.

When the asset-related information includes external-network connection information, the computing device 12 may set the complexity index for the asset to a third level CX3 (S205).

When the asset-related information does not include software-related information, the computing device 12 may determine whether the asset-related information includes network-connection information (S207). Network-connection information may include both external-network connection information and internal-network connection information.

When the asset-related information does not include network-connection information, the computing device 12 may set the complexity index for the asset to a first level CX1 (S209).

When the asset-related information includes network-connection information but the network-connection information is not external-network connection information (i.e., includes only internal-network connection information), the computing device 12 may set the complexity index for the asset to a second level CX2 (S211).

Figure 4:
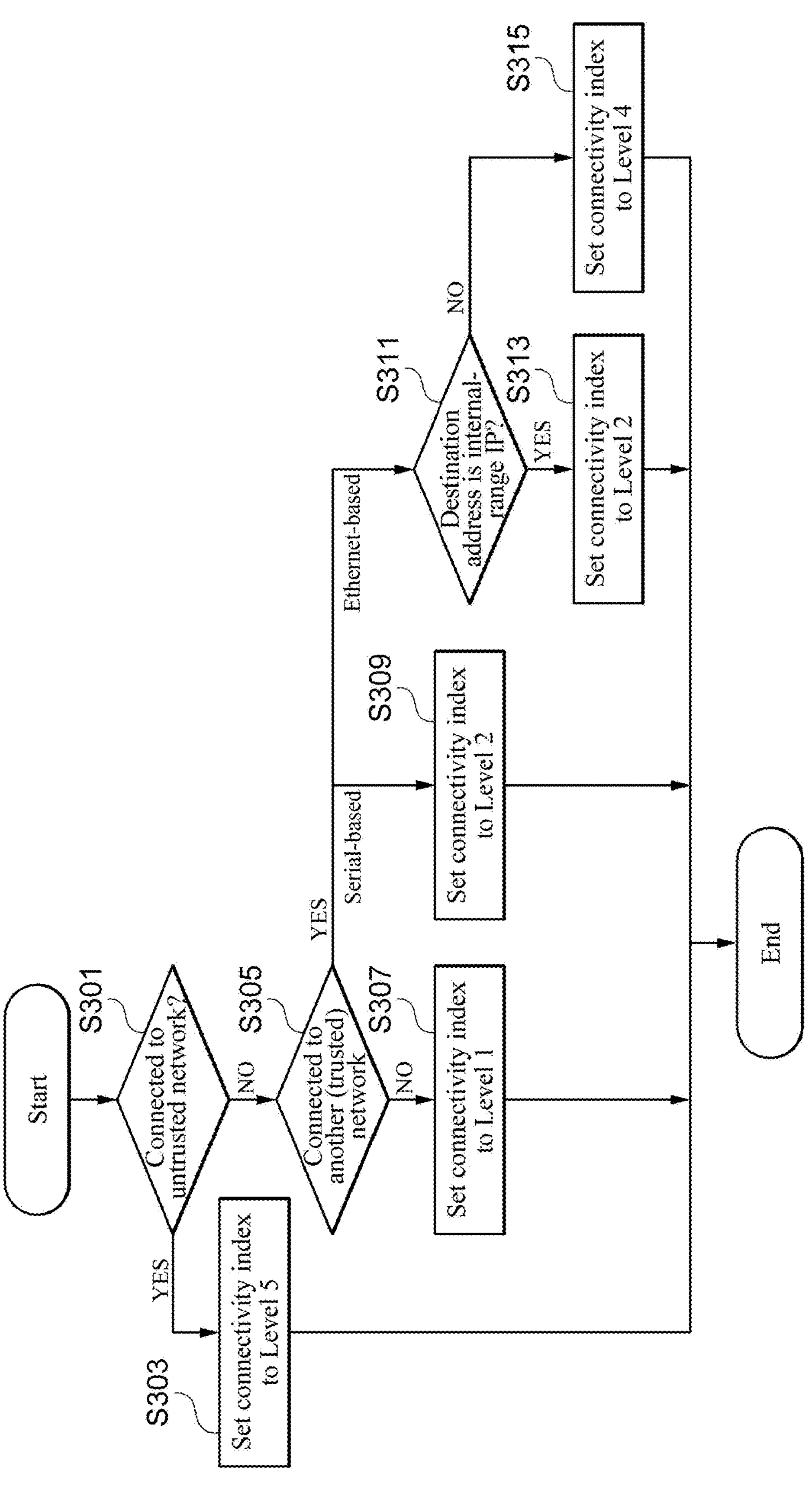
FIG. 4 is a flowchart illustrating a process of calculating a connectivity index according to one embodiment of the present disclosure.

FIG. 4 is a flowchart illustrating a process of calculating a connectivity index according to one embodiment.

Referring to FIG. 4, the computing device 12 may determine, based on asset-related information, whether an asset is connected to an untrusted network (S301).

When the asset is connected to the untrusted network, the computing device 12 may set the connectivity index for the asset to a fifth level CY5 (S303).

When the asset is not connected to the untrusted network, the computing device 12 may determine whether the asset is connected to another trusted network (S305).

When the asset is not connected to the other trusted network, the computing device 12 may set the connectivity index for the asset to a first level CY1 (S307).

When the asset is connected to the other trusted network, and a physical interface connected to the other trusted network is serial-based communication, the computing device 12 may set the connectivity index for the asset to a second level (CY2) (S309).

When the physical interface connected to the other trusted network is Ethernet-based communication, the computing device 12 may determine whether a destination IP address of the Ethernet-based communication is an internal-range IP address (S311).

When the destination IP address of the Ethernet-based communication is an internal-range IP address, the computing device 12 may set the connectivity index for the asset to a third level CY3 (S313).

When the destination IP address of the Ethernet-based communication is an external-range IP address, the computing device 12 may set the connectivity index for the asset to a fourth level CY4 (S315).

Figure 5:
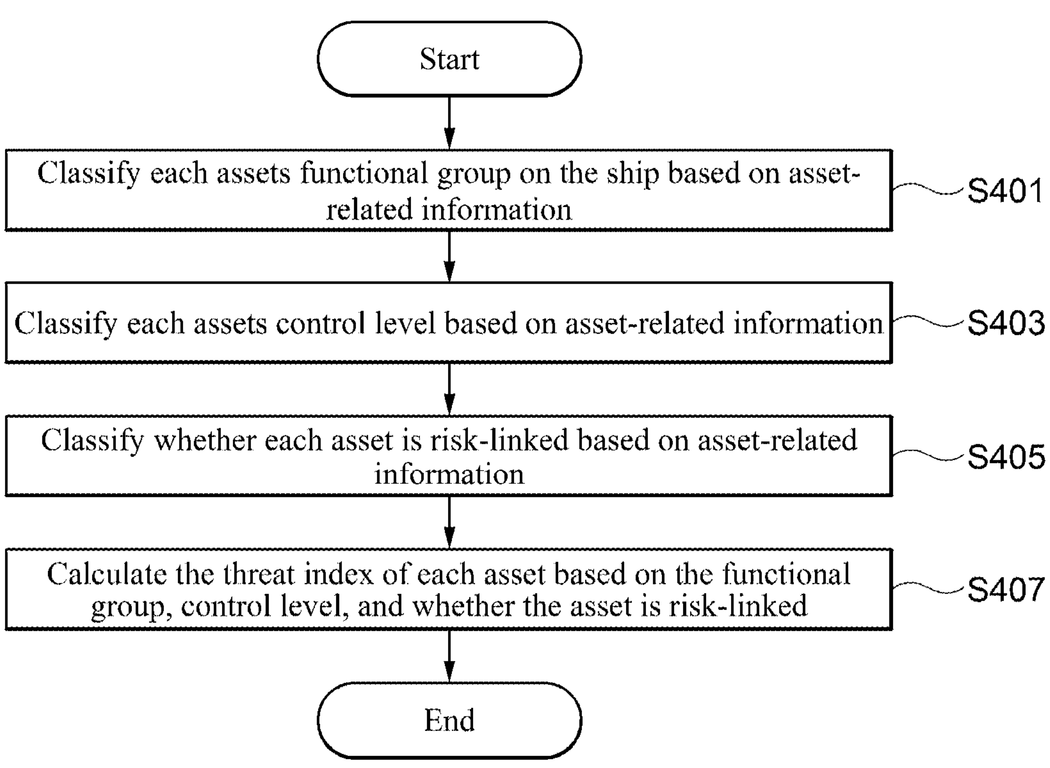
FIG. 5 is a flowchart illustrating a process of calculating a threat index according to one embodiment of the present disclosure.

FIG. 5 is a flowchart illustrating a process of calculating a threat index according to one embodiment. Although the illustrated flowchart describes the method as a plurality of steps, at least some of the steps may be performed in a different order, performed in combination with other steps, omitted, divided into sub-steps, or performed with one or more additional steps not shown.

Referring to FIG. 5, the computing device 12 may classify, based on asset-related information, a functional group of each asset on the ship (S401). In one embodiment, the computing device 12 may classify each asset into one of predefined functional groups using an asset name, a functional description, an equipment type, and the like.

In one embodiment, functional groups on the ship may be classified into a first functional group through a third functional group. The first functional group may correspond to office and auxiliary systems (e.g., assets used for simple office work, welfare, and convenience). The second functional group may correspond to voyage support and control-assist systems (e.g., assets supporting ship operation or performing logistics-related functions). The third functional group may correspond to safety navigation systems providing essential functions for safe navigation of the ship.

Next, the computing device 12 may classify, based on asset-related information, a control level of each asset (S403). A control level may indicate an extent to which the asset controls actual physical facilities. In one embodiment, control levels include a first control level through a third control level.

The first control level may correspond to a case where the asset only monitors status and does not control physical facilities. The second control level may correspond to a case where the asset changes operating conditions indirectly (e.g., parameter setting, mode switching, limit adjustment) without directly actuating physical facilities. The third control level may correspond to a case where the asset directly controls on/off or an operating state of physical facilities.

Next, the computing device 12 may classify whether each asset is risk-linked (also referred to as safety-critical) based on asset-related information (S405), that is, whether failure or malfunction of the asset is directly linked to an emergency situation or safety of human life or the ship. In one embodiment, the computing device 12 may classify whether an asset is risk-linked based on an asset name, installation location, system classification, and the like.

Next, the computing device 12 may calculate the threat index of each asset based on the functional group, the control level, and whether the asset is risk-linked (S407). Thus, in disclosed embodiments, indirectly derived indicators (functional group, control level, and risk linkage) are used to calculate the threat index.

For example, when an asset belongs to the first functional group, has the first control level, and is not risk-linked, the computing device 12 may set the threat index to a first level. When an asset belongs to the first functional group but is risk-linked, the threat index may be set to a second level. When an asset belongs to the second functional group and has the second or third control level, the threat index may be set to a second level. When an asset belongs to the third functional group, has the first control level, and is not risk-linked, the threat index may be set to a second level.

Further, when an asset belongs to the third functional group, has the second control level, and is risk-linked, the threat index may be set to a third level. When an asset belongs to the second functional group and has the third control level, the threat index may be set to a third level.

The computing device 12 may evaluate a risk level of each asset based on the basic assessment-factor indices and the security-factor scores.

Figure 6:
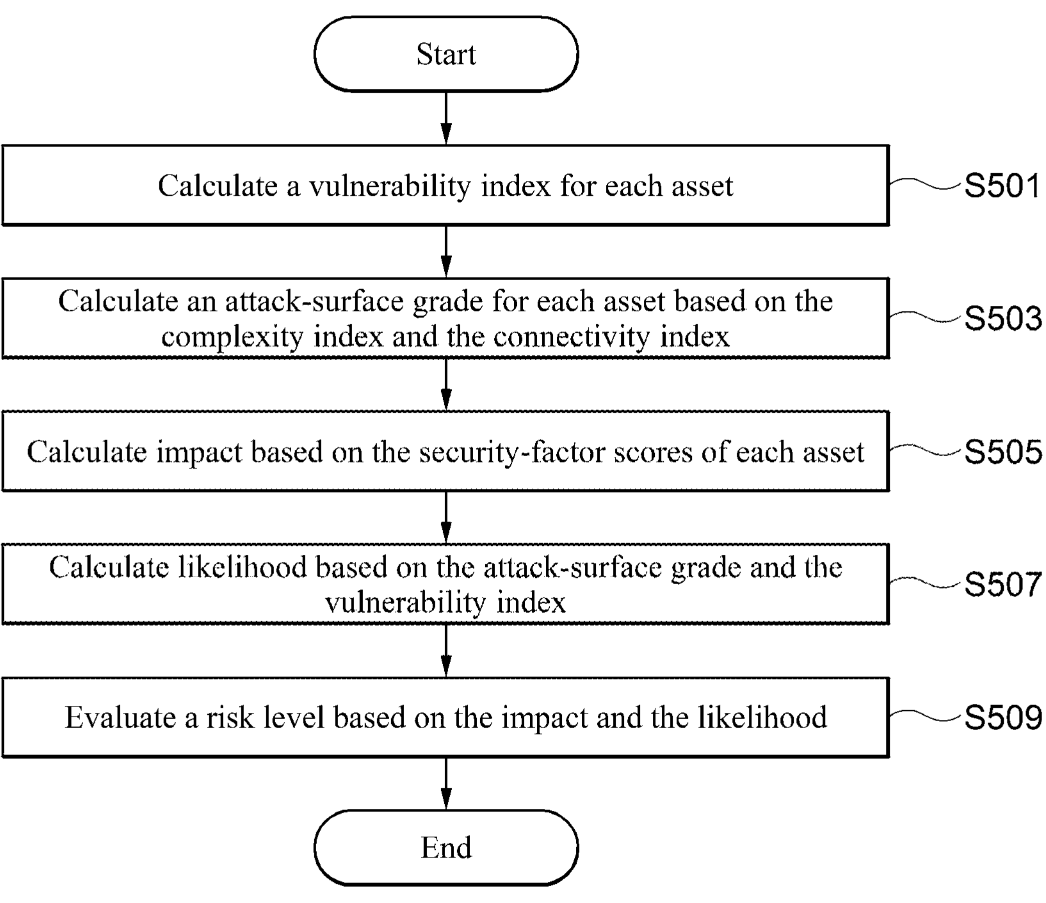
FIG. 6 is a flowchart illustrating a method of evaluating a risk level of each asset according to one embodiment of the present disclosure.

FIG. 6 is a flowchart illustrating a method of evaluating a risk level of each asset according to one embodiment. Although the illustrated flowchart describes the method as a plurality of steps, at least some of the steps may be performed in a different order, performed in combination with other steps, omitted, divided into sub-steps, or performed with one or more additional steps not shown.

Referring to FIG. 6, the computing device 12 may calculate a vulnerability index of each asset (S501). The vulnerability index may be calculated based on a physical vulnerability index, a technical vulnerability index, and an administrative vulnerability index.

In one embodiment, the computing device 12 may provide a physical vulnerability checklist to a user. The user may be a user who requests a cybersecurity assessment for each asset on the ship. The computing device 12 may provide a physical vulnerability checklist to a user via a user interface. In this case, the user may check items corresponding to physical vulnerabilities in the physical vulnerability checklist. The computing device 12 may calculate a physical vulnerability index based on a ratio of a number of checked items to a total number of items, and the physical vulnerability index may be classified into multiple levels based on the ratio.

The computing device 12 may provide a technical vulnerability checklist to the user. In this case, the user may check items corresponding to technical vulnerabilities in the technical vulnerability checklist. Items in the technical vulnerability checklist may be assigned different scores according to importance. The computing device 12 may calculate a technical vulnerability index based on a ratio of an accumulated score of checked items to a total possible score, and the technical vulnerability index may be classified into multiple levels based on the ratio.

The computing device 12 may provide an administrative vulnerability checklist to the user. Each item may allow the user to select one or more answers, and different answers may have different assigned scores. The computing device 12 may calculate an administrative vulnerability index based on an accumulated score according to the user's answers, and the administrative vulnerability index may be classified into multiple levels based on the accumulated score.

The computing device 12 may calculate the vulnerability index by summing the calculated physical, technical, and administrative vulnerability indices, and may apply respective weights to the physical, technical, and administrative vulnerability indices.

Next, the computing device 12 may calculate an attack-surface grade for each asset based on the complexity index and the connectivity index among the basic assessment-factor indices (S503). In one embodiment, the computing device 12 may calculate the attack-surface grade by summing (e.g., weighted summing) the complexity index and the connectivity index.

Next, the computing device 12 may calculate an impact of a cybersecurity attack on the ship based on the security-factor scores of each asset (S505). In one embodiment, the computing device 12 may calculate the impact by summing the Confidentiality, Integrity, and Availability scores of the asset.

Next, the computing device 12 may calculate a likelihood of a cybersecurity threat based on the attack-surface grade and the vulnerability index of each asset (S507). In one embodiment, the likelihood may be calculated by summing the attack-surface grade and the vulnerability index.

Next, the computing device 12 may evaluate a risk level of each asset based on the impact and the likelihood (S509). In one embodiment, the computing device 12 may calculate the risk level by multiplying the impact by the likelihood.

Meanwhile, when calculating the vulnerability index for each asset, the computing device 12 may provide, based on the vulnerability checklists provided for the calculation, a list of protective measures that the user can apply. That is, the computing device 12 may extract vulnerability items (or unmitigated vulnerability items) that the user has checked in each of a physical vulnerability checklist, a technical vulnerability checklist, and an administrative vulnerability checklist. The computing device 12 may provide, to the user, a list (a "protective-measure list") of protective measures applicable by the user among the extracted vulnerability items. In one embodiment, the computing device 12 may provide the protective-measure list to the user via a user interface.

Each protective measure may be assigned a risk-reduction score that can lower the risk level when the protective measure is applied, and different risk-reduction scores may be assigned according to types of protective measures.

Table 1 is a table showing risk-reduction scores according to types of protective measures in one embodiment of the present disclosure.

TABLE 1

| Major Category | Subcategory | Risk-Reduction Score |
|---|---|---|
| Non-Technical Protective Measures | Human-related protective measures | 1 |
| Non-Technical Protective Measures | Physical protective measures | 2 |
| Non-Technical Protective Measures | Organizational protective measures | 3 |
| Technical Protective Measures | Monitoring protective measures | 6 |
| Technical Protective Measures | Hardening protective measures | 7 |

Referring to Table 1, protective measures may be broadly classified into non-technical protective measures and technical protective measures. The non-technical protective measures may include human-related protective measures, physical-factor-related protective measures, and organizational-factor-related protective measures, to which risk-reduction scores of 1, 2, and 3 may be assigned, respectively. In addition, the technical protective measures may include monitoring-related protective measures (e.g., supervision and monitoring) and hardening-related protective measures that make external access more difficult, to which risk-reduction scores of 6 and 7 may be assigned, respectively.

In one embodiment, when multiple protective measures within a single major category are applied, the highest risk-reduction score among the applied protective measures within that major category may be applied. Further, when both a non-technical protective measure and a technical protective measure are applied, a risk-reduction score of 10 may be applied.

The computing device 12 may re-evaluate the risk level of the corresponding asset by reflecting the risk-reduction score assigned to each protective measure when each protective measure in the protective-measure list is applied. For example, the user may select and apply one or more protective measures that the user can implement from the protective-measure list. In this case, the computing device 12 may re-evaluate the risk level of the asset by reflecting the risk-reduction score assigned to the applied protective measure(s). In one embodiment, re-evaluation of the risk level may be performed according to Equation 4 below.

$$RL' = RL - (\text{risk-reduction score}) \quad \text{[Equation 4]}$$

RL': re-evaluated risk level; RL: original risk level.

In addition, the computing device 12 may determine an application priority among the protective measures included in the protective-measure list. In one embodiment, the computing device 12 may assign, for each protective measure included in the protective-measure list, priority scores based on implementation cost, urgency, and difficulty.

Specifically, the computing device 12 may assign a first priority score according to an implementation cost required for each protective measure. In this case, as the implementation cost decreases, the first priority score may be assigned to be higher, and as the implementation cost increases, the first priority score may be assigned to be lower.

In addition, the computing device 12 may assign a second priority score according to urgency of each protective measure. In one embodiment, the computing device 12 may determine the urgency of each protective measure based on at least one of a re-evaluated risk level and a risk-level change amount. The computing device 12 may set a higher urgency for a protective measure as the re-evaluated risk level increases. Further, the computing device 12 may set a higher urgency as the risk-level change amount (i.e., a difference between the re-evaluated risk level and an original risk level) increases. The computing device 12 may assign a lower second priority score as urgency decreases and may assign a higher second priority score as urgency increases.

In addition, the computing device 12 may assign a third priority score according to difficulty of each protective measure. In this case, as difficulty increases, the third priority score may be assigned to be lower, and as difficulty decreases, the third priority score may be assigned to be higher.

The computing device 12 may calculate, for each protective measure, a total priority score by summing the first priority score, the second priority score, and the third priority score. The computing device 12 may determine an application priority for the protective measures included in the protective-measure list according to the total priority scores. In this case, as the total priority score increases, the application priority may be set to be higher.

In addition, the computing device 12 may determine an application timing for each protective measure according to the application priority. In one embodiment, the application timing may be categorized as immediate (Quick-Win), short-term (Short-Term), mid-term (Mid-Term), and long-term (Long-Term), but is not limited thereto.

In addition, for an asset whose calculated risk level or security-factor score is equal to or greater than a threshold, the computing device 12 may not merely display assessment results, but may generate configuration values for security control items applicable in the ship network. For example, depending on whether there is an untrusted-network connection, whether communication with an external-range destination address occurs, or whether a particular communication protocol is used, the computing device 12 may generate a security-control configuration set including a network segmentation policy, an access control list (ACL) or firewall rule template, monitoring targets (e.g., log collection and alert conditions), and hardening configuration items. The generated security-control configuration set may be output in a machine-readable format (e.g., a text-based policy definition or configuration template) and may be applied by, or used for review for application by, a security management system on the ship. Accordingly, the present embodiment provides technical outputs that can be directly used for actual configuration and operation of ship OT network security beyond mere security assessment.

Figure 7:
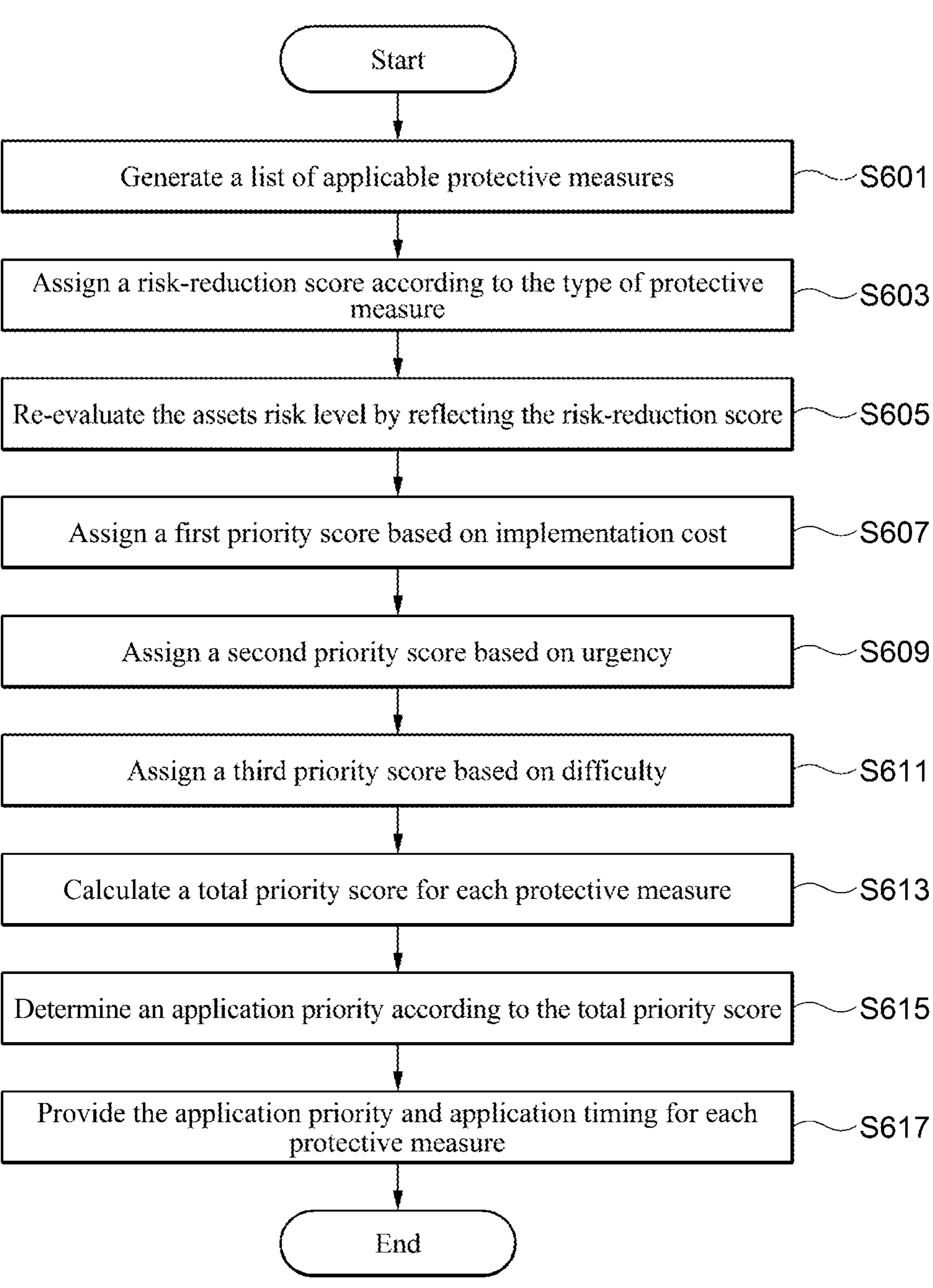
FIG. 7 is a flowchart illustrating a method of setting an application priority for protective measures according to one embodiment of the present disclosure.

FIG. 7 is a flowchart illustrating a method of setting an application priority for protective measures according to one embodiment of the present disclosure. Although the illustrated flowchart describes the method as a plurality of steps, at least some of the steps may be performed in a different order, performed in combination with other steps, omitted, divided into sub-steps, or performed with one or more additional steps not shown.

Referring to FIG. 7, the computing device 12 may generate a protective-measure list applicable by the user based on the vulnerability checklists (S601). Next, the computing device 12 may assign a risk-reduction score to each protective measure included in the protective-measure list according to a type of the protective measure (S603). Next, the computing device 12 may re-evaluate the risk level of the corresponding asset by reflecting the risk-reduction score assigned to each protective measure when each protective measure in the protective-measure list is applied (S605). Next, the computing device 12 may assign a first priority score according to an implementation cost required for each protective measure included in the protective-measure list (S607). Next, the computing device 12 may assign a second priority score according to urgency of each protective measure included in the protective-measure list (S609). In this case, the urgency of each protective measure may be set based on at least one of the re-evaluated risk level and the risk-level change amount. Next, the computing device 12 may assign a third priority score according to difficulty of each protective measure included in the protective-measure list (S611). Next, the computing device 12 may calculate a total priority score for each protective measure by summing the first priority score, the second priority score, and the third priority score (S613). Next, the computing device 12 may determine an application priority for the protective measures included in the protective-measure list according to the total priority scores (S615). Next, the computing device 12 may determine an application timing for each protective measure according to the application priority and may provide, to the user, the application priority and the application timing for each protective measure (S617).

Figure 8:
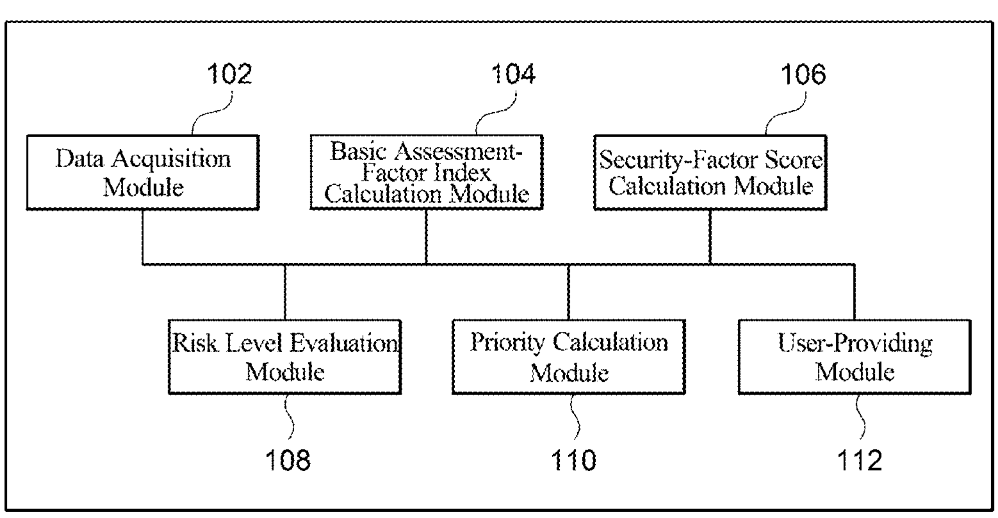
FIG. 8 is a block diagram illustrating a configuration of a ship asset assessment apparatus according to one embodiment of the present disclosure.

FIG. 8 is a block diagram illustrating a configuration of a ship asset assessment apparatus 100 according to one embodiment.

Referring to FIG. 8, the ship asset assessment apparatus 100 may include a data acquisition module 102, a basic assessment-factor index calculation module 104, a security-factor score calculation module 106, a risk level evaluation module 108, a priority calculation module 110, and a user-providing module 112.

The data acquisition module 102 may obtain asset-related information for each asset on a ship that is a target of cybersecurity assessment. In one embodiment, the data acquisition module 102 may receive, as input, an asset data file that follows an IACS asset inventory standard, but is not limited thereto.

The basic assessment-factor index calculation module 104 may calculate basic assessment-factor indices based on asset-related information for each asset. The module 104 may automatically calculate the complexity index, the connectivity index, and the threat index by inputting asset-related information for each asset into a rule set defined for each basic assessment factor.

The security-factor score calculation module 106 may calculate security-factor scores based on the basic assessment-factor indices of each asset. The module 106 may automatically calculate Confidentiality, Integrity, and Availability scores based on the complexity, connectivity, and threat indices.

The risk level evaluation module 108 may evaluate a risk level of each asset based on the basic assessment-factor indices and the security-factor scores. The module 108 may calculate a vulnerability index of each asset based on physical, technical, and administrative vulnerability indices. The module 108 may calculate an attack-surface grade based on the complexity and connectivity indices. The module 108 may calculate an impact based on security-factor scores and may calculate a likelihood based on the attack-surface grade and the vulnerability index. The module 108 may evaluate a risk level based on the impact and the likelihood.

The priority calculation module 110 may generate a protective-measure list applicable by a user based on vulnerability checklists and may set an application priority among protective measures based on implementation cost, urgency, and difficulty.

The user-providing module 112 may provide, to a user, an interface for data input and an interface for outputting results (including intermediate results) in a process of performing cybersecurity assessment for ship assets.

In one embodiment, the user-providing module 112 may provide an interface for receiving, from a user, asset-related information for each asset. FIG. 9 illustrates a state in which a user-providing module receives asset-related information according to one embodiment of the present disclosure.

The user-providing module 112 may provide, to the user, results of calculating the security-factor scores for each asset. FIG. 10 illustrates a screen displaying security-factor scores of each asset according to one embodiment of the present disclosure. Referring to FIG. 10, the user-providing module 112 may display, on a screen, automatically calculated Confidentiality scores, Integrity scores, and Availability scores for respective assets (e.g., a steering system, an anchoring and mooring system, a propulsion system, and the like).

The user-providing module 112 may provide, to the user, a physical vulnerability checklist, a technical vulnerability checklist, and an administrative vulnerability checklist, respectively, for calculating the vulnerability index of each asset. FIG. 11 illustrates a screen providing a portion of a physical vulnerability checklist to a user according to one embodiment of the present disclosure.

The user-providing module 112 may provide, to the user, information regarding a risk level of each asset. The user-providing module 112 may provide, together with the risk level of each asset, values of indices used to calculate the risk level (e.g., the basic assessment-factor indices, the vulnerability index, and the like). FIG. 12 illustrates a screen providing a risk level of each asset according to one embodiment of the present disclosure.

The user-providing module 112 may provide, to the user, a list of protective measures that the user can apply. FIG. 13 illustrates a screen providing a portion of a protective-measure list according to one embodiment of the present disclosure.

The user-providing module 112 may provide, to the user, a re-evaluated risk level of an asset when each protective measure in the protective-measure list is applied. FIG. 14 illustrates a screen providing a re-evaluated risk level (RRL) of an asset according to one embodiment of the present disclosure.

The user-providing module 112 may provide, to the user, criteria of implementation cost, urgency, and difficulty for determining an application priority for each protective measure. FIG. 15 illustrates a screen providing criteria of implementation cost, urgency, and difficulty for determining an application priority for each protective measure according to one embodiment of the present disclosure.

The user-providing module 112 may provide, to the user, an application timing according to the application priority of each protective measure. In this case, the user-providing module 112 may also provide, together, the risk level and/or the re-evaluated risk level of each asset. FIG. 16 illustrates a screen providing an application timing for each protective measure according to one embodiment of the present disclosure.

The user-providing module 112 may provide a report of cybersecurity assessment for each ship asset to the user. In this case, the report may record the overall assessment process. In one embodiment, the user-providing module 112 may input, to a large language model (LLM), materials provided to the user and feedback received from the user during the assessment process to output the report.

As used herein, the term "module" may refer to a functional and structural combination of hardware and software for driving the hardware to perform the technical idea of the present disclosure. For example, a "module" may refer to a logical unit of predetermined code and hardware resources for executing the code, and does not necessarily mean physically connected code or a single type of hardware.

According to disclosed embodiments, the basic assessment-factor indices (complexity, connectivity, and threat) and the security-factor scores (Confidentiality, Integrity, and Availability) can be automatically calculated using asset-related information as input, thereby enabling consistent cybersecurity assessment for the same asset and reliable assessment even when asset-related information changes. Further, protective measures can be suggested based on vulnerability checklists, risk levels can be re-evaluated by applying risk-reduction scores, and application priorities can be used to efficiently manage risk. In addition, by reflecting technical attributes of a ship OT communication environment, such as external-range destination addresses, untrusted-network connections, and serial/Ethernet interface characteristics, risk levels can be rapidly recalculated when assets or network configurations change, thereby reducing re-assessment delay. Furthermore, weight adjustment based on event logs collected during ship operation can reflect changes in risk patterns over time, improving alignment with real operating environments compared to static rule-based assessments.

While exemplary embodiments have been described in detail, a person having ordinary skill in the art will understand that various modifications may be made without departing from the scope of the present disclosure. Accordingly, the scope of the present disclosure should not be limited to the described embodiments, and should be defined by the claims and equivalents thereof.

What is claimed is:

1. A method performed by a computing device comprising one or more processors and a memory storing one or more programs to be executed by the one or more processors, the method comprising:

obtaining asset inventory data comprising asset-related information for each asset existing in a ship that is a target of cybersecurity assessment, the asset inventory data comprising at least one of identification information of an asset, network-connection information, network-interface information, an installation location of the asset, an operating system (OS) version, a firmware version, a software version, a communication protocol, an IP/MAC address, a certificate, and an update log;

verifying whether any required field is missing in the asset inventory data and normalizing the asset-related information by converting the asset inventory data into a preset standard format;

for each asset, automatically calculating a basic assessment-factor index comprising a complexity index, a connectivity index, and a threat index by inputting the asset-related information into an algorithm or rule set defined for each basic assessment factor;

calculating, based on the calculated complexity index, connectivity index, and threat index, security-factor scores comprising a Confidentiality score, an Integrity score, and an Availability score;

calculating, for each asset, a vulnerability index based on user answers to a vulnerability checklist for assets on the ship;

evaluating a risk level of each asset on the ship based on the basic assessment-factor index, the security-factor scores, and the vulnerability index;

generating, for an asset whose risk level exceeds a preset threshold, a security-control configuration set comprising at least one of a network segmentation policy, an access control list (ACL), a firewall rule, a monitoring target, and hardening configuration items; and transmitting the security-control configuration set to a security management system of the ship.

2. The method of claim 1, wherein calculating the security-factor scores comprises:

expressing each of the Confidentiality score, the Integrity score, and the Availability score as a weighted sum of the complexity index, the connectivity index, and the threat index;

applying a first weight to the complexity index, applying a second weight to the connectivity index, and applying a third weight to the threat index; and setting the first weight, the second weight, and the third weight differently for the calculation of the Confidentiality score, the Integrity score, and the Availability score.

3. The method of claim 2, wherein:

for the calculation of the Confidentiality score, the weights are set in an order of second weight>first weight>third weight;

for the calculation of the Integrity score, the weights are set in an order of third weight>second weight>first weight; and for the calculation of the Availability score, the third weight is higher than the first weight and the second weight.

4. The method of claim 2, further comprising:

collecting event logs related to incidents, failures, and pre-incident indicators occurring in each asset during operation of the ship;

estimating correlation coefficients between types of security factors and the basic assessment-factor indices based on the collected event logs; and automatically calibrating, as operating data accumulates, sensitivity of security-factor score calculation by adjusting the first weight, the second weight, and the third weight based on the estimated correlation coefficients.

5. The method of claim 1, wherein the automatically calculating of the complexity index comprises:

determining whether the asset-related information comprises software-related information of the asset;

when the asset-related information comprises the software-related information, determining whether the asset-related information comprises external-network connection information;

when the asset-related information comprises the external-network connection information, setting the complexity index for the asset to a third level;

when the asset-related information does not comprise the software-related information, determining whether the asset-related information comprises network-connection information;

when the asset-related information does not comprise the network-connection information, setting the complexity index for the asset to a first level; and when the asset-related information comprises the network-connection information but the network-connection information is not external-network connection information, setting the complexity index for the asset to a second level.

6. The method of claim 1, wherein the calculating of the connectivity index comprises:

determining, based on the asset-related information, whether the asset is connected to an untrusted network;

when the asset is connected to the untrusted network, setting the connectivity index for the asset to a fifth level;

when the asset is not connected to the untrusted network, determining whether the asset is connected to another trusted network;

when the asset is not connected to the other trusted network, setting the connectivity index for the asset to a first level;

when the asset is connected to the other trusted network, when a physical interface connected to the other trusted network is serial-based communication, setting the connectivity index for the asset to a second level; and when the physical interface connected to the other trusted network is Ethernet-based communication, when a destination address of the Ethernet-based communication is an internal-range IP address, setting the connectivity index for the asset to a third level, and when the destination address is an external-range IP address, setting the connectivity index for the asset to a fourth level.

7. The method of claim 1, wherein the calculating of the threat index comprises:

classifying, based on the asset-related information, a functional group of each asset on the ship;

classifying, based on the asset-related information, a control level of each asset;

classifying, based on the asset-related information, whether each asset is risk-linked; and calculating the threat index of each asset based on the functional group, the control level, and whether the asset is risk-linked.

8. The method of claim 1, further comprising:

providing, based on the vulnerability checklist, a list of protective measures applicable by a user;

re-evaluating the risk level of the asset by reflecting, when a protective measure is applied, a risk-reduction score assigned to the protective measure; and updating and outputting the security-control configuration set based on a result of the re-evaluating.

9. The method of claim 8, further comprising determining an application priority among protective measures included in the list of protective measures, wherein the application priority is determined based on at least one of an implementation cost, urgency, and difficulty for each protective measure.

10. The method of claim 9, wherein the determining of the application priority comprises:

assigning a first priority score according to an implementation cost of each protective measure;

assigning a second priority score according to urgency of each protective measure;

assigning a third priority score according to difficulty of each protective measure; and summing the first, second, and third priority scores for each protective measure to obtain a total priority score and determining the application priority according to the total priority score.

11. A computing device comprising:

a processor; and a memory storing one or more programs to be executed by the processor, wherein, when executed, the one or more programs cause the processor to:

obtain asset inventory data comprising asset-related information for each asset existing in a ship that is a target of cybersecurity assessment, the asset inventory data comprising at least one of identification information of an asset, network-connection information, network-interface information, an installation location of the asset, an operating system (OS) version, a firmware version, a software version, a communication protocol, an IP/MAC address, a certificate, and an update log;

verify whether any required field is missing in the asset inventory data and normalize the asset-related information by converting the asset inventory data into a preset standard format;

for each asset, automatically calculate a basic assessment-factor index comprising a complexity index, a connectivity index, and a threat index by inputting the asset-related information into an algorithm or rule set defined for each basic assessment factor;

calculate, based on the calculated complexity index, connectivity index, and threat index, security-factor scores comprising a Confidentiality score, an Integrity score, and an Availability score;

calculate, for each asset, a vulnerability index based on user answers to a vulnerability checklist for assets on the ship;

evaluate a risk level of each asset on the ship based on the basic assessment-factor index, the security-factor scores, and the vulnerability index;

generate, for an asset whose risk level exceeds a preset threshold, a security-control configuration set comprising at least one of a network segmentation policy, an access control list (ACL), a firewall rule, a monitoring target, and hardening configuration items; and transmit the security-control configuration set to a security management system of the ship.

12. A non-transitory computer-readable storage medium storing instructions that, when executed by one or more processors of a computing device, cause the computing device to:

obtain asset inventory data comprising asset-related information for each asset existing in a ship that is a target of cybersecurity assessment, the asset inventory data comprising at least one of identification information of an asset, network-connection information, network-interface information, an installation location of the asset, an operating system (OS) version, a firmware version, a software version, a communication protocol, an IP/MAC address, a certificate, and an update log;

verify whether any required field is missing in the asset inventory data and normalize the asset-related information by converting the asset inventory data into a preset standard format;

for each asset, automatically calculate a basic assessment-factor index comprising a complexity index, a connectivity index, and a threat index by inputting the asset-related information into an algorithm or rule set defined for each basic assessment factor;

calculate, based on the calculated complexity index, connectivity index, and threat index, security-factor scores comprising a Confidentiality score, an Integrity score, and an Availability score;

calculate, for each asset, a vulnerability index based on user answers to a vulnerability checklist for assets on the ship;

evaluate a risk level of each asset on the ship based on the basic assessment-factor index, the security-factor scores, and the vulnerability index;

generate, for an asset whose risk level exceeds a preset threshold, a security-control configuration set comprising at least one of a network segmentation policy, an access control list (ACL), a firewall rule, a monitoring target, and hardening configuration items; and transmit the security-control configuration set to a security management system of the ship.

* * * * *